United States Patent
Törnkvist

(10) Patent No.: US 8,014,800 B2
(45) Date of Patent: Sep. 6, 2011

(54) CHARGING OF NUMBERS TRIGGERED PREMIUM SMS

(75) Inventor: Robert Törnkvist, Karlshamn (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 791 days.

(21) Appl. No.: 12/090,025

(22) PCT Filed: Oct. 10, 2006

(86) PCT No.: PCT/SE2006/001148
§ 371 (c)(1),
(2), (4) Date: May 7, 2008

(87) PCT Pub. No.: WO2007/043946
PCT Pub. Date: Apr. 19, 2007

(65) Prior Publication Data
US 2008/0254817 A1    Oct. 16, 2008

(30) Foreign Application Priority Data

Oct. 13, 2005  (EP) .................... 05445075

(51) Int. Cl.
*H04W 4/00* (2009.01)
(52) U.S. Cl. .................... 455/466; 455/432.1; 455/433; 455/435.1
(58) Field of Classification Search .................. 455/466, 455/432.1, 433, 435.1, 422.1
See application file for complete search history.

*Primary Examiner* — Temica M Beamer

(57) ABSTRACT

A method and arrangement for enabling a mobile terminal user currently roaming in a visited mobile network, to execute a purchase by means of an SMS payment mechanism. An SMS message containing a purchase request is received from the mobile terminal. After detecting that the SMS message is addressed to an external SMS center in a home mobile network different from the visited one, the address of the external SMS center in the SMS message is changed into the address of an internal SMS center in the visited network. The modified SMS message is then routed towards the internal SMS center where the purchase can be confirmed if a called number in the message matches a product/service provider registered as being authorized to offer said SMS payment mechanism.

16 Claims, 3 Drawing Sheets

CHARGING OF NUMBERS TRIGGERED PREMIUM SMS

TECHNICAL FIELD

The present invention relates generally to a method and arrangement for enabling payments with mobile terminals when not located in a mobile home network. In particular, the existing mobile communication service known as Premium SMS (Short Message Service) is used for making payments when located in a visited mobile network, e.g. abroad.

BACKGROUND OF THE INVENTION AND PRIOR ART

In mobile telecommunication networks, a payment service has been introduced allowing mobile users to pay for products and services by means of their mobile terminals, instead of using cash, a credit card or similar. This method provides for high security and convenience, and is chiefly attractive for making so-called "micro-payments" involving limited amounts and typically when not being served by a person. Currently, some typical examples of usage include various web services for, e.g., information delivery and downloading of files over the Internet such as ring tones, being particularly popular today. The mobile payment service can also be utilised when paying for physical items in vending machines, travelling tickets, parking fees, etc. In the following description, the general terms "products and services" are intended to represent anything that can be paid for with this service.

Typically, the existing SMS mechanism can be used for this purpose basically in the following manner. A product/service provider may first offer a mobile user to purchase some product or service at a certain price, by the user sending an SMS message containing some specific code or the like associated with the product/service, to a given telephone number associated with the product/service provider. After sending the SMS, the user can be charged later for the purchase by his/her mobile network operator, either in a regular subscription bill or by deduction from a prepaid account.

This mechanism thus relies on a billing relation between the user and his/her mobile network operator, as well as a trusted relation between the mobile network operator and the product/service provider. The term "premium SMS" is often used to denote this service. A similar service called "premium call" is also available for making payments in a similar manner by means of any type of telephone. The user then calls a given telephone number and is prompted to enter some code or the like during the call in order to confirm a purchase. The premium SMS method is generally considered to be the more user-friendly of the two. Another great advantage with these telephone payment methods is that they do not require special functions or modifications in the telephones used, but will work for any legacy telephones.

FIG. 1 illustrates a procedure in an exemplary GSM mobile network for paying a parking fee by means of a mobile terminal A, according to the prior art. Terminal A is currently connected to a mobile home network 100 by means of conventional network elements including a radio base station, not shown. A user of terminal A approaches a parking meter 102, belonging to a parking system managed by means of a parking centre 104, and is offered the option to pay the parking fee by sending a given code "abc" as an SMS message to a given number "71xxx". A prefix or suffix in the code may be used to indicate a desired parking duration. Payment instructions and rates may be presented on a sign or the like at the parking site.

This number 71xxx has previously been assigned to the parking system 102/104, in a mutual agreement to provide the SMS payment service over the network 104. Hence, the parking system has been registered with network 100 in a register database 106, as an authorised service provider associated with number 71xxx, as schematically indicated by a dashed arrow between 104 and 106. It is common for mobile network operators to reserve entire series in their numbering scheme, typically abbreviated numbers, for "hire" by any potential product/service providers wanting to register as authorised providers of the premium SMS payment service.

After deciding to utilise the offered SMS payment option, the user now opts to send an SMS message 108 according to the given instructions. Terminal A then creates a string containing specific fields of information, including a message field 110 containing the "payload" message abc as entered by the user. Further, a called number field 112 contains the number 71xxx as dialed by the user, and a calling number field 114 is also added presenting the telephone number A of terminal A. Hence, the SMS message 108 basically contains a purchase request according to these fields.

Mobile terminals are configured to further automatically add the address of an SMS centre in their mobile home networks, to all SMS messages in general. In this way, all SMS messages are initially directed to the "home" SMS centre for further delivery to the destination according to the called number. Therefore, terminal A in this case adds a field 116 to the message 108 containing the address "SMSC" of an SMS centre 118 in network 100, being the home network of terminal A as mentioned above.

Accordingly, the accessed network 100 routes the SMS message 108 to SMS centre 118, in a first step 1:1.

Receiving the message 108, SMS centre 118 recognises that this is not an ordinary SMS message addressed to a mobile user, but a purchase request, by reading the called number 71xxx in field 112. In a next illustrated step 1:2, SMS centre 118 compares the called number 71xxx with registered numbers of authorised premium SMS payment service providers in the register database 106. If a match is found, the requested purchase can be admitted and a suitable purchase confirmation is conveyed to the parking centre 104, in a final step 1:3. Thereby, the purchased service can be "delivered" to the user, in this case by activating the parking meter 102, having the same effect as if the user had inserted cash or a credit card or similar, in the parking meter 102. The parking centre 104 may then send some kind of delivery acknowledgement, not shown, back to the SMS centre 118 or other suitable network node.

The purchased service can be charged for in different ways. Typically, the service provider, in this case represented by the parking centre 104, sends a specification to the mobile operator on the amount spent, and the mobile operator in turn adds the amount, along with a suitable remuneration, to a regular subscription bill of the terminal user. Alternatively, a fixed increased call fee for premium SMS calls may be used, covering all expenses for the purchase including a compensation to the network operator, such that a specific bill or report from the service provider would not be needed for each purchase. Settlement can then be made either by giving the service provider a share of the call fees, or by means of a charge specification made by the service provider. The call fee may also be differentiated for plural hired numbers and/or depending on a message embedded in the SMS, thereby enabling different rates for different products/services sold by the same provider.

WO 2005/050575 A1 discloses a system for paying parking fees using mobile telephones, basically in the manner described above. A user sends an SMS message to a dedicated telephone number of the system, the message containing at least the license number of the user's vehicle, a code identifying the parking area, and a password. The user will then be charged for the parking in a regular telephone bill.

However, if the terminal user is not connected to its home network, but is currently accessing a visited mobile network, e.g. when roaming abroad, the premium SMS payment service cannot be used in the latter network for the following reasons. As illustrated in FIG. 2, a terminal A currently roaming in a visited mobile network 200, but belonging to a different home network 200' by means of subscription, is not able to purchase offered products/services by means of the premium SMS method. If any regular SMS message is sent to another mobile user, the SMS message will always be routed to the home SMS centre first, which then delivers it to the addressed user. If the addressed user is also located in the same visited network, the SMS message would first be routed to the home network and then back to the visited network, sometimes referred to as the "trombone" effect.

Referring to FIG. 2, the user of terminal A attempts to pay a parking fee, as in FIG. 1, by means of premium SMS as offered by a parking system, here merely represented by parking centre 202. In this example, both networks 200 and 200' include an SMS centre 204 and 204', respectively. Also, both are capable of providing the SMS payment service to their subscribers on behalf of product/service providers registered in a register database 206 and 206', respectively. Thus, parking centre 202 is registered as a service provider in register database 206, as indicated by the dotted arrow there between, authorised to offer the SMS payment service, just as parking centre 104 was registered in register database 106 in FIG. 1.

Hence, terminal A sends an SMS message in a first step 2:1 according to given purchase instructions, just as described for FIG. 1 above. However, terminal A is still configured to automatically add the address of the home SMS centre (as field 116 in FIG. 1) to any SMS message, regardless of where it is currently located. When receiving the SMS containing the address of home SMS centre 204', a suitable switching node (not shown) in the visited network 200, typically an MSC or similar, would accordingly route this message to SMS centre 204' in home network 200', in a step 2:2, and not to SMS centre 204 in the visited network where parking centre 202 is actually registered.

Since the parking centre 202 is naturally not registered as a service provider in register database 206' of the home network, no match will be found in database 206' when checking the called number 71xxx (as field 112 in FIG. 1), in a step 2:3. Therefore, this step will end the process and no service or product can be delivered since the purchase cannot be confirmed. This failure may of course result in frustration and a cancelled purchase.

In fact, it is possible to manipulate a mobile terminal to change the SMSC address momentarily such that the address of SMS centre 204 in the visited network is added to the SMS message, replacing the home SMS centre 204' address as automatically configured. However, this is somewhat complicated to do and very few users are likely to know of it, requiring knowledge of the SMS mechanism and the address of the visited SMS Centre. Moreover, changing the SMSC address to the visited SMSC is only relevant to get access to premium SMS payment services in the visited network, and this address must therefore be restored to the home SMSC address afterwards for normal SMS traffic. Another hypothetical possibility would be for product/service providers to register with mobile network operators in foreign countries, but this would require much effort and may not be viable in many cases.

Hence, it is generally a problem that mobile users cannot readily utilise the attractive and convenient premium SMS payment method for making purchases when roaming in a visited mobile network, also resulting in lost revenue for both product/service providers and network operators. The significance of this problem will naturally increase further as this payment service is spread to even more vendors and fields of application, and also due to an increasingly global environment with more roaming terminal users.

SUMMARY OF THE INVENTION

The object of the present invention is to reduce or eliminate the problems outlined above. In particular, it is an object of the present invention to provide a solution for enabling a user to make payments or purchases by means of a mobile terminal, even when roaming in a visited mobile network, without requiring modifications in the used terminal.

This object and others are obtained by providing a method and arrangement for enabling a mobile terminal user currently roaming in a visited mobile network, to execute a purchase by means of an SMS payment mechanism, or any equivalent mechanism generally using mobile messages.

In the inventive method according to one aspect, an SMS message is received from the mobile terminal, containing a purchase request using the SMS payment mechanism. It is then detected that the received SMS message is directed to an external SMS centre in a home mobile network of the user different from the visited one, by reading a field in the SMS message containing an address of the external SMS centre which has been automatically added to the message by the mobile terminal. The received SMS message is then modified by changing the address of the external SMS centre into the address of an internal SMS centre in the visited network. Finally, the modified SMS message is routed towards the internal SMS centre according to the changed address, such that the purchase can be confirmed if a called number in the message matches a product/service provider registered as being authorised to offer said SMS payment mechanism.

Before modifying the SMS message, it may be determined whether the message can be admitted as a purchase request using the SMS payment mechanism. The receiving and detecting steps may be executed in a routing unit in the visited network, and when detecting either that the SMS message contains a purchase request, or that the given SMS centre address does not belong to the visited network, or both, the message may be diverted to a service control unit in the visited network where the determining step is executed. If the SMS purchase request can be admitted to proceed, the service control unit may return an instruction to the routing unit to execute the modifying and sending steps.

The SMS message may be determined to be admitted by checking whether the received SMS message is an authorised purchase request. For example, the SMS message may be checked with respect to at least one of: what type of requested product/service, predefined agreements and permissions from the user's home mobile network, and potential collisions in numbering schemes of the visited and home networks. Checking the SMS message may further include inquiring the user's home mobile network.

The SMS message may be detected to contain a purchase request based on said called number given in the message and/or the message contents.

The inventive arrangement according to another aspect comprises means for receiving an SMS message from the mobile terminal containing a purchase request using the SMS payment mechanism, and means for detecting that the received SMS message is directed to an external SMS centre in a home mobile network different from the visited one, based on an address of the external SMS centre contained in a field in the SMS message which has been automatically added to the message by the mobile terminal. The inventive arrangement further comprises means for modifying the received SMS message by changing the address of the external SMS centre into the address of an internal SMS centre in the visited network, and means for routing the modified SMS message towards the internal SMS centre according to the changed address. Then, the purchase can be confirmed if a called number in the message matches a product/service provider registered as being authorised to offer said SMS payment mechanism.

The arrangement may further comprise means for determining whether said SMS message can be admitted as a purchase request using the SMS payment mechanism, before modifying the message. The receiving and detecting means may be implemented in a routing unit in the visited network, and when said detecting means either detects that the SMS message contains a purchase request, or that the given SMS centre address does not belong to the visited network, or both, it is adapted to divert the message to a service control unit in the visited network where said determining means is implemented. If the SMS purchase request can be admitted to proceed, the service control unit may be adapted to return an instruction to the routing unit to modify and send the SMS message towards the internal SMS centre.

The determining means may be adapted to check whether the received SMS message is an authorised purchase request. The determining means may be further adapted to check the SMS message with respect to at least one of: what type of requested product/service, predefined agreements and permissions from the user's home mobile network, and potential collisions in numbering schemes of the visited and home networks. The determining means may be further adapted to check the SMS message by inquiring the user's home mobile network.

The arrangement may further comprise means for detecting that the SMS message contains a purchase request based on said called number given in the message and/or the message contents.

Further preferred features and benefits of the present invention will become apparent from the detailed description below.

BRIEF DESCRIPTION OF THE DRAWINGS

The present invention will now be described in more detail by means of preferred embodiments and with reference to the accompanying drawings, in which.

DESCRIPTION OF PREFERRED EMBODIMENTS

The present invention provides a solution allowing SMS payment from a mobile terminal even when located in a visited mobile network but belonging to a different mobile home network, without requiring any specific function or modification in the mobile terminal. Briefly described, as the visited network receives a premium SMS as payment for a purchase from a product/service provider registered with the visited network, the SMS centre address of the home network automatically given in the SMS message is changed into the address of the SMS centre in the visited network. Thereby, the SMS message will be routed thereto such that the purchase can be completed since a match can be found in the visited network with the registered product/service provider.

Today, SMS is a well-established type of written mobile messages and the SMS payment mechanism can currently be used in various fields of application. However, it should be noted that the following description can be valid for any type of mobile messaging mechanism that may be useful for paying by means of a mobile terminal in general. Thus, in the following, the term "SMS message" should be understood as representing any type of written mobile messages in a broad sense.

Figure 1:
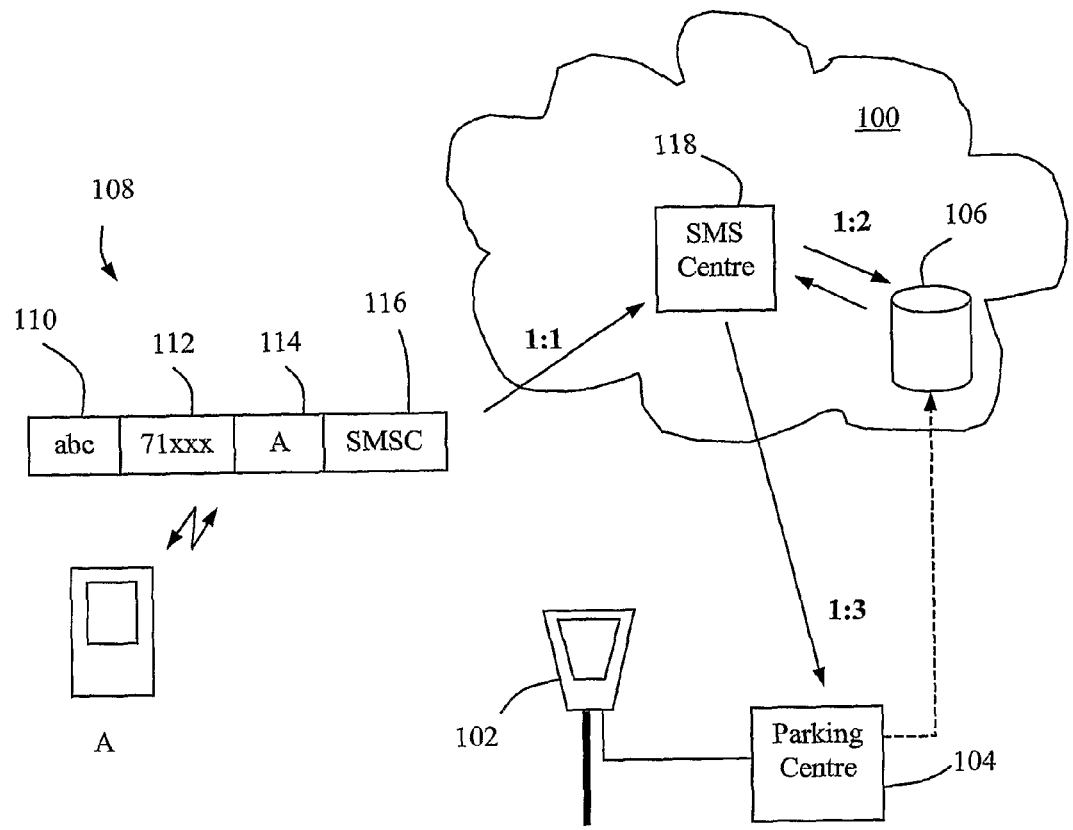
FIG. 1 is a basic network scenario for making a purchase by means of the premium SMS payment service in a mobile home network, according to the prior art.
Figure 2:
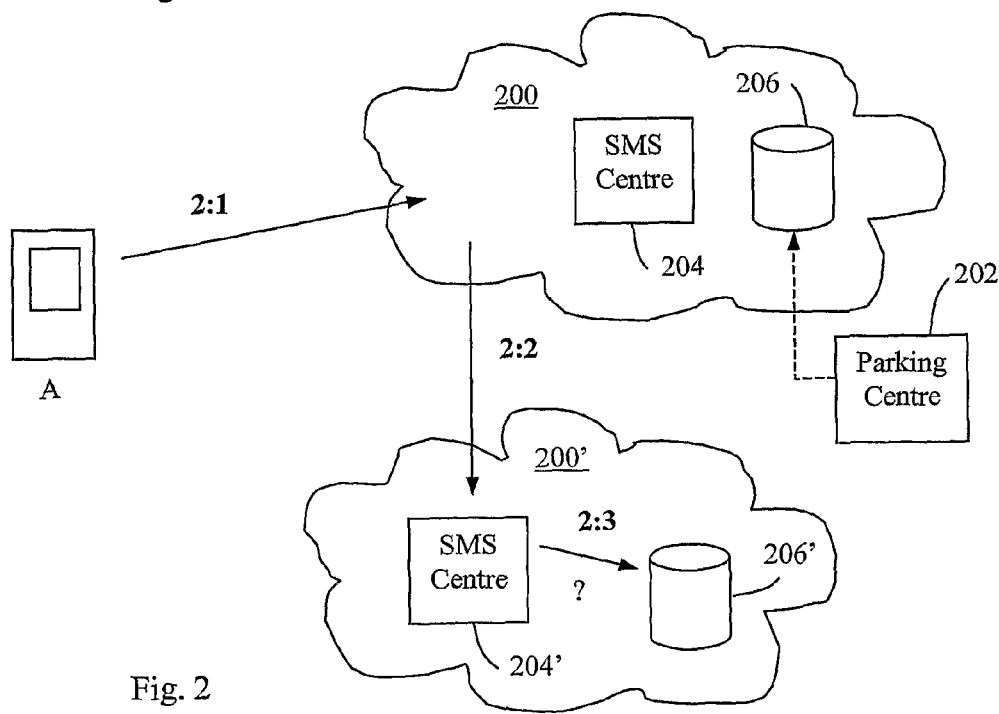
FIG. 2 is a basic network scenario for a failed purchase attempt by means of the premium SMS payment service in a visited mobile network, according to the prior art.
Figure 3:
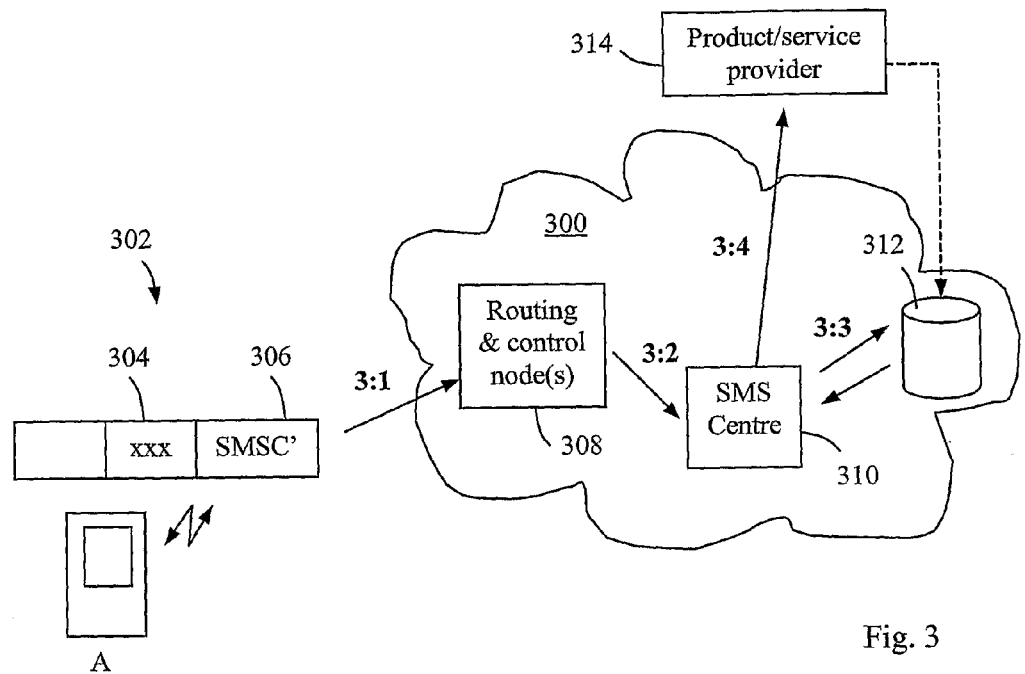
FIG. 3 is a basic network scenario for a successful purchase by means of the premium SMS payment service in a visited mobile network, according to a preferred embodiment.

FIG. 3 illustrates schematically a basic procedure for enabling a user of a mobile terminal A to make an SMS-based purchase in a visited network 300. In the same manner as previously described for FIGS. 1 and 2, and according to given purchase instructions, terminal A sends an SMS message 302 containing a purchase request, in a first step 3:1. Again, the SMS includes a called number field 304 and a field 306 containing the address SMSC' of the home network SMS centre, not shown. No further fields in the SMS 302, as described for FIG. 1, are shown here for simplicity. The address SMSC' in field 306 has been automatically added by terminal A before sending the SMS, as being customary for any existing mobile terminals capable of sending SMS messages.

The message 302 is received and processed in various routing and control nodes 308 in the visited network 300, which will be described in more detail later below. After detecting, by reading fields 304 and 306, that message 302 contains a purchase request using the SMS payment service, but is addressed to an SMS centre not belonging to the visited network 300, the SMS message is modified by changing the address SMSC' in field 306 into the address SMSC of the SMS centre 310 of the current network 300. The identity of terminal A, as given in message 302, may also be checked before modifying the message.

Thereby, the modified SMS message will be routed to SMS centre 310, in a following step 3:2, instead of to the one in the terminal's home network as in FIG. 2, step 2:2. Furthermore, the validity of the purchase request is checked to establish that the SMS message can be admitted as a purchase request using the SMS payment mechanism, before executing step 3:2.

Next, SMS centre 310 compares the called number indicated in field 304 with telephone numbers stored in a register database 312, in a step 3:3. Just like register database 106 in FIG. 1, the numbers stored in database 312 are associated with product/service providers being authorised to offer the SMS payment mechanism to customers in network 300. In step 3:3, it is detected that the SMS message 302 was sent to pay for a service or product from a specific product/service provider 314 matching the number in field 304. If the payment is further found to be valid and allowed, e.g. after inquiry to the buyer's home network, a purchase confirmation is sent to product/service provider 314, in a step 3:4. In the purchase confirmation, the code entered by the user in the SMS is preferably provided to indicate specifics regarding the purchase, such as identifying a product or service, quantity, duration, delivery details, etc. Otherwise, this information may be extracted from the SMS and provided explicitly in the purchase confirmation.

Charging for the purchase may now be conducted basically according to normal procedures, just like any call costs would be charged to the visiting user according to a roaming agreement or the like between the visited network 300 and the user's home network. Thus, the purchase costs may be charged in a suitable subscription bill to the user, or by deduction from a prepaid account. Alternatively, the product/service provider 314 may charge the visited network 300 specifically for the purchase, which then charges the home network in turn, etc. The product/service provider 314 may also send a bill directly to the user without involving the visited and home networks in the purchase charging procedure, e.g. depending on how the purchase offer has been presented. The present invention is thus not limited to any specific charging routines, although it could be preferable to utilise the regular and trusted subscription charging routine already established between the user and his/her home network operator.

A signalling procedure will now be described, with reference to a signalling diagram in FIG. 4, for executing a purchase in a visited network by means of the above-described SMS mechanism. Reference will also be made to FIG. 3 as the signalling steps to be described can basically be used in the process illustrated there. The prerequisites are thus basically the same as for FIG. 3 and will not be repeated here. The elements involved in FIG. 4 include a user-operated mobile terminal A 400, a visited network 402 and a product/service provider 410, hereafter called "provider" for short. Terminal A is currently roaming in the visited network 402, but belongs by subscription or similar to a home network different from the visited one.

The visited network 402 includes various routing nodes normally handling the routing of calls with any mobile terminals accessing the network 402, here generally denoted "routing unit" 404. If the visited network is a conventional GSM network, the routing nodes would typically include a Base Transceiver Station BTS, a Base Station Controller BSC and a Mobile Switching Centre MSC. In the following procedure, the routing unit 404 may suitably be an MSC, although the described function can be implemented in one or more other suitable routing nodes as well. The present invention is thus not limited in this respect. The visited network 402 further includes a service control unit 406, sometimes called a "Service Control Point" or similar, and an SMS centre 408.

In a first step 4:1, terminal A sends an SMS according to given purchase instructions, just as described for any of FIGS. 1-3, which is processed in the routing unit 404 for further routing. In a next illustrated step 4:2, the routing unit 404 checks the received SMS, particularly with respect to its destination number (field 304 in FIG. 3) and the terminal-added address of an SMS centre in the home network of terminal A (field 306 in FIG. 3). According to somewhat different embodiments, when detecting either that the SMS is intended to effect a purchase, i.e. that it is a premium SMS, or that the given SMS centre address does not belong to the visited network, or both, it is diverted to the service control unit 406 for further control, in a step 4:3. The given calling number of terminal A may also be checked in step 4:2 above to detect that it belongs to a different network.

Next, the service control unit 406 checks the SMS in step 4:4 to determine whether the received SMS is an authorised purchase request or not. This check may be based on various parameters and conditions, such as what type of requested product/service, predefined agreements and permissions from the home network, potential collisions in numbering schemes of the visited and home networks, etc. This check may include inquiring the buyer's home network as well.

If the SMS purchase request can be admitted to proceed, the service control unit 406 returns an instruction to change its SMS centre address from home SMSC' to visited SMSC, to the routing unit 404 in a following step 4:5. Accordingly, the routing unit 404 modifies the received SMS by changing the SMS centre address in field 306 and routes the modified SMS towards that SMS centre 408, in a step 4:6.

In a following illustrated step 4:7, SMS centre 408 checks the received SMS by comparing the called number given in field 304 with registered providers stored in register database 312. If a match is found, SMS centre 408 can send a purchase confirmation or order to the targeted provider 410, in a step 4:8. In this step, the message code in field 304 may simply be conveyed to provider 410 indicating specifics of the purchase as described above, possibly together with the called number of field 304 as well if the provider uses a plurality of different numbers for different offered product/service alternatives. Alternatively, SMS centre 408 may be configured to extract such information from the code and number and optionally other fields in the SMS, and send it out more explicitly.

The provider may then acknowledge delivery of the purchased product/service in a response to the SMS centre, in a step 4:9. Finally, the SMS centre may send a purchase report or similar to the routing unit 404, in a step 4:10, to be conveyed to the home network operator of terminal A for charging. If specific call rates are used for the SMS to cover all purchase expenses, the report sent in step 4:10 is a regular call charging record to be handled according to conventional routines used in the roaming agreement between the visited network 402 and the home network of terminal A. On the other hand, if the provider 410 charges the user directly by means of an invoice or by deduction from a given credit card or the like, step 4:10 could naturally be omitted.

Figure 4:
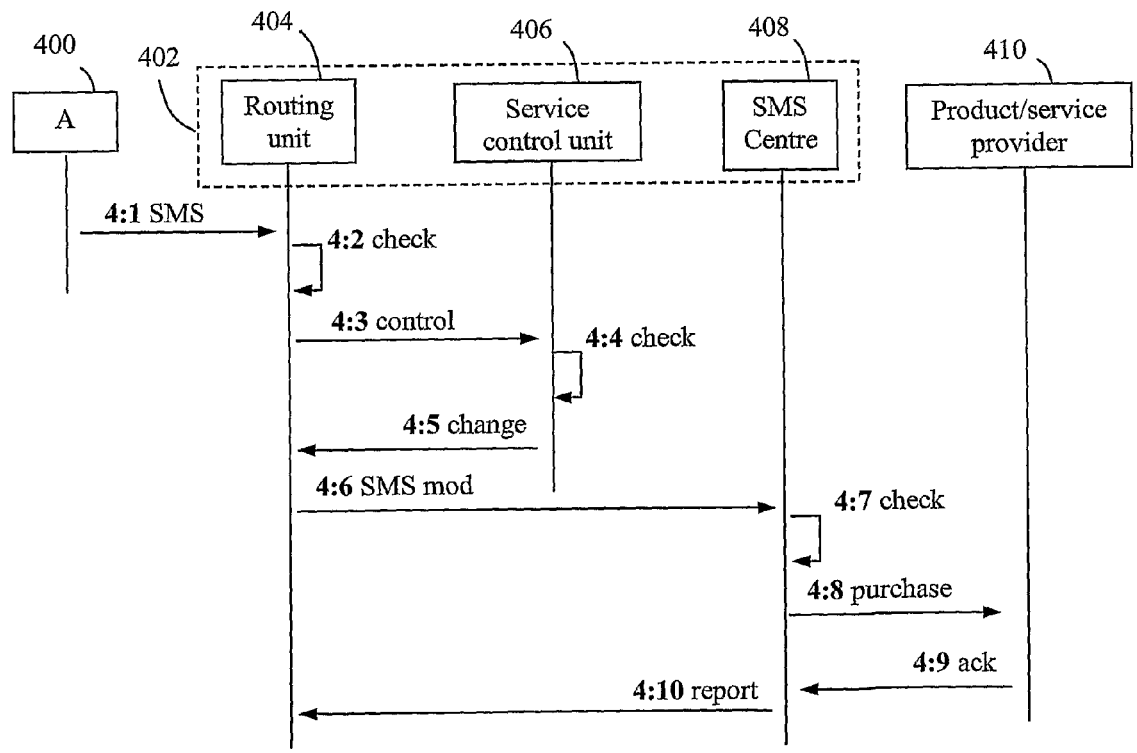
FIG. 4 is a signalling diagram illustrating a purchase procedure employing the SMS payment service, according to another preferred embodiment.

In the above-described preferred embodiment according to FIG. 4, only the routing unit 404 and the service control unit 406 are affected by the new proceedings, whereas the terminal 400, the SMS centre 408 and the service provider 410 can be conventional unmodified units that will not notice any difference from regular behaviours. In an alternative embodiment, the functions described for the routing unit 404 and the service unit 406 may be integrated in a common unit, e.g. implemented in an MSC of a GSM type network, or in an SGSN (Serving GPRS support node) of a GPRS (General Packet Radio Service) or WCDMA (Wideband Code Division Multiple Access) type network, or in a separate server unit within the visited network 402. Using such a common unit, signalling steps 4:3 and 4:5 above will of course be superfluous. Moreover, both checking steps 4:2 and 4:4, i.e. basically determining that the purchase is admitted and changing the SMSC address in field 306, will be executed in that unit.

Figure 5:
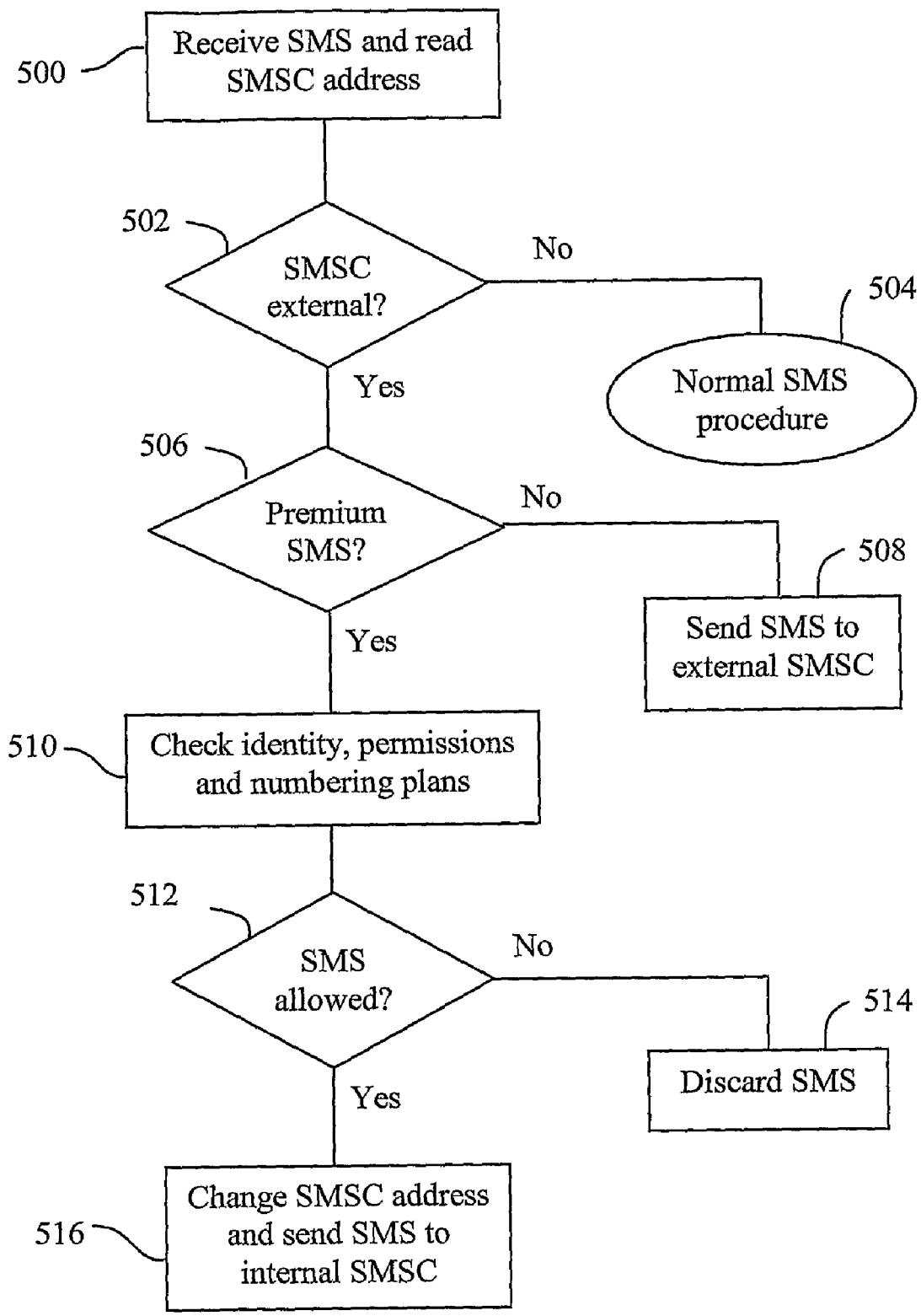
FIG. 5 is a flow chart illustrating a procedure for generally handling a received SMS message in a mobile network, according to another preferred embodiment.

Next, a procedure for generally handling a received SMS message in a mobile network in accordance with the present invention, will now be described with reference to the flow chart in FIG. 5. The mobile network in question may be the visited network 300 or 402 in FIGS. 3 and 4, respectively, and the method may be implemented in the routing unit 404 and service control unit 406 of FIG. 4, or in a combined unit as described above. In a first step 500, an SMS message is initially received and the SMSC address contained therein is read. In a next step 502, it is determined whether the SMSC address is "external", i.e. belongs to a mobile network different from the present one. If not, the SMS was evidently sent from a subscriber in the present network, given the usual habit of mobile terminals to add the address of their home SMSC in any SMS before transmission. Thus, the received SMS can then be processed according to the normal procedure as indicated by a step 504. However, if it is determined in step 502 that the SMSC address is external, the sender is evidently visiting the current network but belongs to another home network. In that case, the process moves on to a step 506 instead.

In step 506, it is determined whether the received SMS is a premium SMS containing a purchase request, or a regular SMS message directed to another mobile user. If it is not a premium SMS but a regular one, the SMS is sent to the external SMS centre, in a step 508, according to the address as given in the SMS which of course was automatically added by the sending terminal A. Thereby, the regular SMS will be further handled by the external home SMS centre according to conventional routines.

So far in the process, the incoming SMS has been basically treated according to conventional proceedings. However, if it is determined in step 506 that the SMS is indeed a premium SMS for conducting a purchase, the SMS is further checked in a next step 510 to determine if the SMS message can be admitted as a premium SMS issued from a visiting terminal. Thus in step 510, the identity of terminal A, its home network and the requested purchase may be checked, and also any prevailing agreements and permissions from the home network, potential collisions in numbering schemes of the visited and home networks, etc., as mentioned above in connection with step 4:4 in FIG. 4. Step 510 may also involve an inquiry to the home network for permission. It should be noted that any conditions may have been defined by the visited network and/or the home network for allowing access to the premium SMS service, and the present invention is not limited in this respect.

The process then moves on to a determining step 512 as to whether the SMS message can be allowed to proceed further towards the intended purchase, depending on the outcome of previous step 510. If not, the SMS is simply discarded in a step 514, and terminal A may also be informed on this fact by sending a suitable error message thereto. If it is determined in step 512 that the purchase requested in the SMS can indeed be allowed to proceed, hence fulfilling all conditions checked in step 510, the SMS centre address given in the SMS is changed and the modified SMS is sent towards the new address, in a final step 516. In this step, the SMS centre address of the home network given in the SMS message is thus changed into the address of an internal SMS centre in the visited network. The SMS message is finally sent thereto such that the purchase can be completed, provided that the receiving internal SMS centre can find a match with a registered product/service provider in the above-described manner.

The exemplary embodiments of the present invention described above thus allow mobile users to readily utilise the frequently offered premium SMS payment method for making purchases, even when roaming in a visited mobile network. Thereby, the business prospects will also expand for both product/service providers and network operators by gaining access to more customers including visiting users subscribing to other networks. Even though the term "SMS message" is used throughout for describing embodiments of the invention and in the following claims, it should be understood as representing any type of equivalent written mobile messages in a broad sense.

A straightforward way of implementing the present solution in mobile networks would be to extend the well-known existing protocol/function called "CAMEL" (Customised Applications for Mobile network Enhanced Logic), currently used, e.g. in GSM type networks, for adding new services. Given the present solution and preferred embodiments, a person skilled in the art would be capable of applying this protocol for implementation, which is therefore not necessary to describe here in any detail. Also other functions such as the well-known "Diameter", may be utilised to extend the premium SMS service with the above-described solution.

While the invention has been described with reference to specific exemplary embodiments, the description is generally only intended to illustrate the inventive concept and should not be taken as limiting the scope of the invention, which is defined by the appended claims.

The invention claimed is:

1. A method of enabling a mobile terminal user currently roaming in a visited mobile network to execute a purchase in the visited mobile network by means of an SMS payment mechanism, the method comprising the following steps:

receiving an SMS message from said mobile terminal, said message containing a purchase request using the SMS payment mechanism, detecting that the received SMS message is directed to an external SMS centre in a home mobile network of said user different from the visited one, by reading a field in the SMS message containing an address of the external SMS centre which has been automatically added to the SMS message by said mobile terminal, modifying the received SMS message by changing the address of the external SMS centre into the address of an internal SMS centre in the visited network, and routing the modified SMS message towards the internal SMS centre according to the changed address, such that the purchase can be confirmed if a called number in the message matches a product/service provider registered as being authorized to offer said SMS payment mechanism.

2. A method according to claim 1, further comprising the step of determining whether said SMS message can be admitted as a purchase request using the SMS payment mechanism, before modifying the received SMS message.

3. A method according to claim 2, wherein said receiving and detecting steps are executed in a routing unit in the visited network, and when detecting either that the SMS message contains a purchase request, or that the given SMS centre address does not belong to the visited network, or both, said message is diverted to a service control unit in the visited network where said admission determining step is executed.

4. A method according to claim 3, wherein, if the SMS purchase request can be admitted to proceed, the service control unit returns an instruction to the routing unit to execute said modifying and sending steps.

5. A method according to claim 2, wherein the SMS message is determined to be admitted by checking whether the received SMS message is an authorized purchase request.

6. A method according to claim 5, wherein the SMS message is checked with respect to at least one of: what type of requested product/service, predefined agreements and permissions from the user's home mobile network, and potential collisions in numbering schemes of the visited and home networks.

7. A method according to claim 5, wherein checking the SMS message includes inquiring the user's home mobile network.

8. A method according to claim 1, wherein the SMS message is detected to contain a purchase request based on said called number given in the message and/or the message contents.

9. An arrangement for enabling a mobile terminal user currently roaming in a visited mobile network, to execute a purchase in the visited mobile network by means of an SMS payment mechanism, comprising:
- means for receiving an SMS message from said mobile terminal, said message containing a purchase request using the SMS payment mechanism,
- means for detecting that the received SMS message is addressed to an external SMS centre in a home mobile network of said user different from the visited one, based on an address of the external SMS centre contained in a field in the SMS message which has been automatically added to the message by said mobile terminal,
- means for modifying the received SMS message by changing the address of the external SMS centre into the address of an internal SMS centre in the visited network, and
- means for routing the modified SMS message towards the internal SMS centre according to the changed address, such that the purchase can be confirmed if a called number in the message matches a product/service provider registered as being authorized to offer said SMS payment mechanism.

10. An arrangement according to claim 9, further comprising means for determining whether said SMS message can be admitted as a purchase request using the SMS payment mechanism, before modifying the received SMS message.

11. An arrangement according to claim 10, wherein said receiving and detecting means are implemented in a routing unit in the visited network, and when said detecting means either detects that the SMS message contains a purchase request, or that the given SMS centre address does not belong to the visited network, or both, said detecting means is adapted to divert the message to a service control unit in the visited network where said determining means is implemented.

12. An arrangement according to claim 11, wherein, if the SMS purchase request can be admitted to proceed, the service control unit is adapted to return an instruction to the routing unit to modify the SMS message and send it towards the internal SMS centre.

13. An arrangement according to claim 10, wherein said determining means is adapted to check whether the received SMS message is an authorized purchase request.

14. An arrangement according to claim 13, wherein said determining means is further adapted to check the SMS message with respect to at least one of: what type of requested product/service, predefined agreements and permissions from the user's home mobile network, and potential collisions in numbering schemes of the visited and home networks.

15. An arrangement according to claim 13, wherein said determining means is further adapted to check the SMS message by inquiring the user's home mobile network.

16. An arrangement according to claim 9, further comprising means for detecting that the SMS message contains a purchase request based on said called number given in the message and/or the message contents.

* * * * *